Jan. 3, 1928.

F. W. SCHMIDT 1,655,165

WHEEL

Filed June 12, 1922

Inventor
Frank W. Schmidt
By his Attorneys
Blackmore, Spencer & Flint.

Patented Jan. 3, 1928.

1,655,165

UNITED STATES PATENT OFFICE.

FRANK W. SCHMIDT, OF JACKSON, MICHIGAN, ASSIGNOR TO GENERAL MOTORS CORPORATION, OF DETROIT, MICHIGAN, A CORPORATION OF DELAWARE.

WHEEL.

Application filed June 12, 1922. Serial No. 567,676.

This invention relates to wheels and more particularly to wheels for motor vehicles.

One of the objects of the invention is the provision of new and improved means for securing a demountable rim on a felly.

Another object of the invention is the provision of a novel rim and felly assembly that is simple in construction, cheap to manufacture, efficient in operation, strong, durable, and that is not likely to get out of order.

Other and further objects and advantages of the invention will appear as the description proceeds.

On the drawings, Fig. 1 is a side elevation of a portion of a wheel with parts in section.

Figure 1:
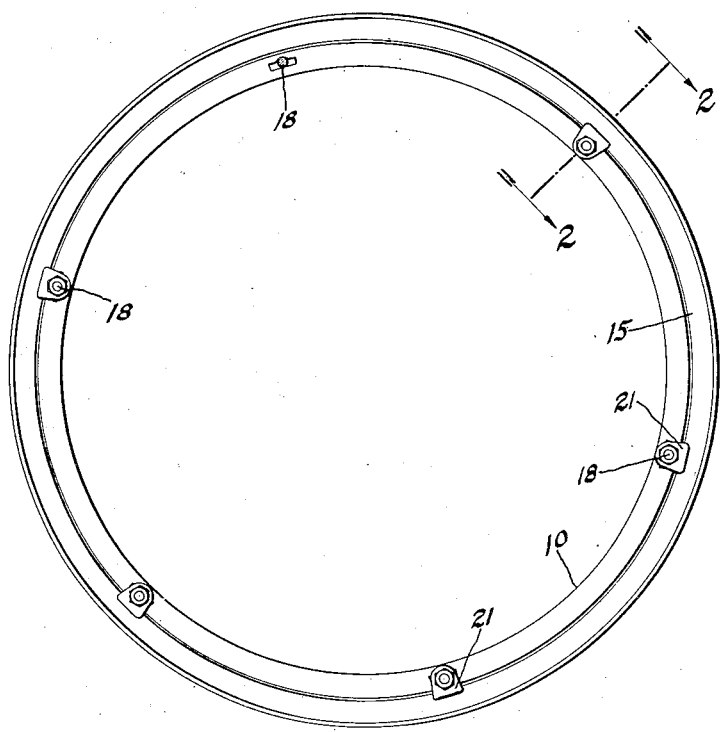
Figure 3:
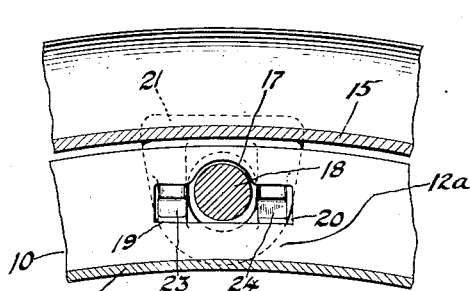
Fig. 3 is a section on line 3—3 of Fig. 2.

On the drawings, the reference character 10 designates a felloe which is preferably channel shaped having the base portion 11, the front flange 12 and the rear flange 13. The rear flange 13 terminates in an inclined or conical seat 14 on which the demountable rim 15 is adapted to engage, as is usual in such constructions. The flanges 12 and 13 are provided with a plurality of aligned openings 16 and 17 through which the clamp bolts 18 are adapted to extend. Since it is not necessary to form depressions in the felloe flanges to provide seats for wedges, as will presently appear, the openings or apertures 16 and 17 may be and preferably are arranged adjacent to the outer edges of the flanges 12 and 13, the apertures 16 being arranged adjacent to the conical seat 14. The apertures 17 in the flange 12 are arranged as far as practicable from the base portion 11 of the felloe in order that the height of the portions 12ª of the flange 12 below said apertures may be sufficient to form with said base portion a non-resilient support for the clamps and the outer side of the rim, as will presently appear. The apertures 17 are extended laterally as at 19 and 20 to form openings at each side of said bolts. The apertures 17 may each be considered as consisting of an elongated opening with an enlarged central portion for receiving the bolt 18 and for properly positioning the same.

In the use of demountable rims on metallic channel felloes, it is the common practice to form a bead in the rim with depressed portions at intervals and to form corresponding depressed portions in the peripheral edge of the outer flange of the felloe in order to form seats for the rim clamps or wedges. The depressions are considered necessary in order to form a sufficient bearing surface for the wedges and in order to permit the rim to more nearly come in contact with the outer flange of the felloe to prevent the entrance of dirt, mud and other foreign substances between the felloe and rim. This construction requires extra time, material and expense in their manufacture. In order to overcome these difficulties and to eliminate the necessity for their use and at the same time retain the advantages of the metallic felloe and rim, clamps instead of wedges are provided for holding the rim 15 in operative position with its inner edge supported on the seat 14. Each of these clamps 21 comprises a body portion having an elongated aperture 22 through which the bolts 18 are adapted to extend. The inner face of the body portion of each clamp is provided with inwardly extending supporting lugs 23 and 24 which are adapted to engage in the extensions 19 and 20 respectively of the aperture 17 at each side of the bolt 18, and the under sides of which lugs are beveled or inclined, as at 23ª, so that a wedging and lifting action upon the outer side of the rim is secured as the nuts upon the bolts 18 are tightened.

These lugs are extended to such length that in applying the rim their ends will not be likely to become accidently disengaged from the corresponding openings 19 and 20, and their beveled under sides cause them to act also as guides for the clamps and to permit a radial movement of said clamps inwardly of the rim while it is being removed or applied.

The lower end of the clamp is provided with a fulcrum 25 which is adapted to engage the outer flange 12 opposite or adjacent to the base 11 of the felloe. The upper end of the clamp is provided with a seat 26 which is shaped to conform to the curvature of the outer edge of the rim 15. The outer face of the clamp 21 is preferably curved and the parts are so constructed and arranged that in any position of the clamp 21 relative to the felloe 10 the nut 27 on the bolt 18 will engage the curved portion of said wedge, preferably at a point, slightly above the center line of said bolt whereby the longest possible leverage may be obtained between the contact point and the fulcrum without danger of bending the bolt when the nut is screwed on.

Figure 2:
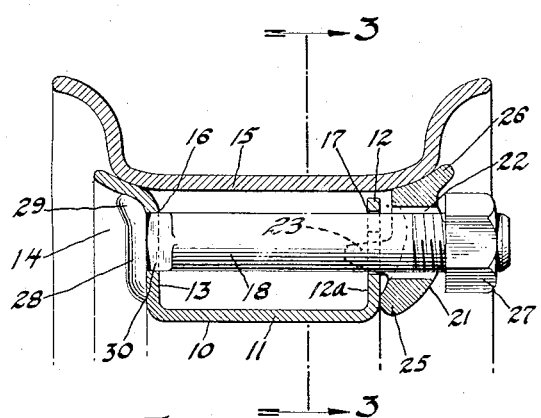
Fig. 2 is a section on line 2—2 of Fig. 1.
Figure 4:
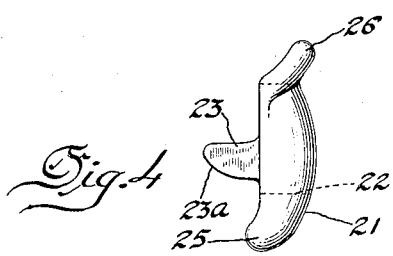
Fig. 4 is a side elevation of one of the clamping members.

The bolt 18 is provided with a head 28 that is adapted to have its upper portion conform to the curve formed by the seat 14 as shown at 29. By this arrangement the portion 29 of the head of the bolt will engage the conical seat 14 and not only prevent the bolt 18 from turning when the nut 27 is applied but it will also strengthen the flange 13 and seat 14 during the application of the rim. Moreover, these portions 29 of the head of the bolt 18 will reenforce the conical seats 14 and assist them in supporting the rim 15 during its operation. By the employment of a shallow channeled felloe made possible by this construction, the head 28 of the bolt 18 may have its lower portion engage the inner flange 13 of the felloe adjacent to the base 11. By this arrangement of the bolt head the flange 13 will not be forced toward the flange 12 when the nut is applied to the bolt 18. If preferred, the bolt 18 may be provided adjacent the head thereof with a squared portion 30 for engaging the correspondingly squared aperture 16 for preventing the bolt from turning, as clearly indicated in Fig. 2 of the drawing.

It will be observed that the outer side of the rim 15 is supported in the seats 26 of the clamps 21 and that in turn these clamps are supported by the lugs 23 and 24 from that portion 12ª of the flange 12 below the opening 17; the clamps thus serving as the sole and only support for the said outer side, which is held in a position spaced apart from the periphery of the front flange 12 of the felloe by the upper ends of the clamps. It will be noted that the lower portion of the opening 17 is a material distance above the base of the felloe 11 whereby the portion 12ª of said flange is adapted to afford a substantial support for the lugs 23 and 24 and at the same time a considerable leverage is provided between the fulcrum 25 and the nut 27. This is considered an important feature of the invention since it permits the use of a clamp instead of a wedge for supporting and retaining the rim in position on the felloe and at the same time provides an arrangement whereby the usual leverage is obtained for maintaining the wedge in operative position. Moreover, since it is not necessary with this arrangement to form depressions in the peripheral edge of the outer flange of the felly to form seats for the clamps or wedges, the depth of the channel of the felly may be materially decreased with a consequent saving in material and expense in the manufacture of the felloes.

It will be understood that various changes in the form, construction, composition and arrangement of the several parts may be resorted to without departing from the spirit and scope of my invention; hence I do not wish to limit myself strictly to the structure herein set forth, but

What I claim is:

1. In combination, a channel felloe comprising a base portion and side flanges, the inner one of said flanges being provided with a rim seat; a rim the inner side of which engages said seat; clamps fulcrumed at their inner ends at the base of the outer one of said flanges, each clamp having an intermediate portion for engaging said last named flange for supporting said rim, the outer side of the rim being spaced from the periphery of the outer one of the flanges of the felloe, and the outer ends of the clamps being so shaped as to engage with and serve as the sole support for the outer side of the rim, and means for holding said clamps, rim and felloe in assembled relation.

2. A clamp comprising a body portion having an elongated aperture therethrough, a fulcrum at one end of said body portion, a rim seat at the other end thereof and a supporting lug on said body portion between said fulcrum and rim seat, said lug being beveled at its outer end.

3. In a device of the class described, a channel shaped felloe having a base portion and oppositely disposed front and rear side flanges, and an inclined rim supporting seat extending throughout the periphery of the rear flange aforesaid; a demountable rim the inner side of which engages and is supported by the inclined seat aforesaid, and the outer side of which extends about and is spaced apart from the periphery of the front flange of the felloe; clamps spaced about the periphery of the felloe and rim and the outer ends of which are so shaped as to engage the outer side of said rim to support the same and to simultaneously force the inner side thereof into engagement with said inclined seat, and the inner ends of which clamps engage the front side flange of the felloe adjacent the base thereof, said clamps having laterally extending supporting lugs between their ends adapted to enter openings provided in the front side flange aforesaid and the inner edges of which openings are above the base of the felloe, to thereby support the outer side of said rim from the front side flange of the felloe and above and free from the periphery of the front flange aforesaid, and which lugs are beveled on their under sides; and bolts extending through holes in the rear flange aforesaid, through the openings aforesaid in said front flange and through holes in said clamps for holding the rim in place upon the felloe.

In testimony whereof I affix my signature.

FRANK W. SCHMIDT.